United States Patent [19]

Breitenstein

[11] Patent Number: 5,419,056
[45] Date of Patent: May 30, 1995

[54] CENTERLESS GAGING APPARATUS FOR CHECKING THE CONCENTRICITY AND STRAIGHTNESS OF SHANK-TYPE TOOLS AND THE LIKE

[75] Inventor: Charles T. Breitenstein, 299 Bond St., Mount Prospect, Ill. 60007

[73] Assignee: Thomas E. Breitenstein, Long Grove, Ill.

[21] Appl. No.: 99,187

[22] Filed: Jul. 29, 1993

[51] Int. Cl.⁶ .............................................. G01B 5/20
[52] U.S. Cl. ...................................... 33/550; 33/549
[58] Field of Search ............ 33/550, 549, 555, 555.1, 33/555.2, 555.3, 568, 569, 573, 832; 269/902, 57

[56] References Cited

U.S. PATENT DOCUMENTS

| | | | |
|---|---|---|---|
| 2,616,068 | 10/1952 | McDonald | 33/549 |
| 3,274,693 | 9/1966 | Witzke | 33/555.3 |
| 4,674,193 | 6/1987 | Wertepny et al. | 33/550 |
| 4,679,330 | 7/1987 | Williams | 33/550 |
| 4,977,682 | 12/1990 | Allen, III | 33/550 |
| 5,044,088 | 9/1991 | Peucker | 33/550 |
| 5,117,081 | 5/1992 | Bagdal | 33/550 |
| 5,182,865 | 2/1993 | Greenslade | 33/550 |

Primary Examiner—Christopher W. Fulton
Attorney, Agent, or Firm—Palmatier & Zummer

[57] ABSTRACT

A cylindrical portion of the tool or workpiece is rotatably supported by two pairs of spherical rollers rotatably carried by two pairs of holders mounted on first and second upright supports secured to a bed. The second support is adjustable to change the spacing between the supports. The holders have screw threads for adjusting the spacing between the rollers. Alternatively, separate feed screws are provided for the holders. A drive belt is looped around the workpiece and around a drive pulley rotatably mounted on a movable carriage biased by a spring to tighten the belt. A knob is provided to rotate the drive pulley. The flights of the belt are pinched toward each other by a pair of guide pulleys and by a pair of rollers adjacent the drive pulley, whereby the upper loop of the belt is kept open and close to the location of the workpiece when it is removed. The carriage may be latched in a belt-loosening position by a swingable latching arm. Optionally, the workpiece may be rotatably supported by two pairs of blades having inclined edges in a V-shaped formation. The blades have smoothly rounded edges for engaging the workpiece with point contacts.

16 Claims, 6 Drawing Sheets

CENTERLESS GAGING APPARATUS FOR CHECKING THE CONCENTRICITY AND STRAIGHTNESS OF SHANK-TYPE TOOLS AND THE LIKE

FIELD OF THE INVENTION

This invention relates to gaging apparatus in general and more particularly to centerless gaging apparatus for checking the concentricity and straightness of shank-type tools and other workpieces which are generally cylindrical, at least along a portion thereof.

BACKGROUND OF THE INVENTION

Difficulty has been encountered in checking the concentricity and straightness along all of the various portions of shank-type tools and other similar workpieces which are generally cylindrical along at least a portion thereof. The reference to generally cylindrical workpieces is meant to include tools and other workpieces of the type having a shank or some other portion which is strictly cylindrical or tapered to some extent.

As to shank-type tools, particularly tools having tapered shanks, there is a need to check the concentricity and straightness of all portions of the tool without mounting the tool in a chuck or some other centering and gripping device which may itself introduce errors into the gaging operation.

Moreover, there is a need to provide a centerless gaging apparatus which can be used effectively with a wide variety of tools and workpieces having wide ranges of length and diameter.

OBJECTS OF THE INVENTION

One object of the present invention is to provide a centerless gaging apparatus which is capable of supporting a wide variety of shank-type tools and other similar workpieces without mounting them in a chuck or the like.

A further object is to provide a centerless gaging device of the foregoing character which is capable of effective use with workpieces having wide ranges of length and diameter.

Another object is to provide a centerless gaging apparatus which is easy to use and moderate in cost.

SUMMARY OF THE INVENTION

In accordance with the present invention, these and other objects are achieved by providing a gaging apparatus for use in gaging the concentricity and straightness of a generally cylindrical tool or other workpiece, the gaging apparatus comprising a horizontal supporting bed, a first upright support mounted on the bed, a second upright support mounted on the bed and spaced along the bed away from the first upright support, a first pair of substantially spherical rollers adapted to be adjustably mounted in a spaced opposed relation on the first upright support, a first pair of roller adjusting means for adjustably supporting the first pair of spherical rollers on the first upright support for adjusting movement toward and away from each other to vary the spacing therebetween to accommodate workpieces of different diameters, a second pair of substantially spherical rollers adapted to be adjustably mounted in a spaced opposed relation on the second upright support, a second pair of roller adjusting means for adjustably supporting the second pair of spherical rollers on the second upright support for adjusting movement toward and away from each other to vary the spacing therebetween to accommodate workpieces of different diameters, the first and second pairs of spherical rollers being adapted to support a generally cylindrical workpiece for rotation relative to the upright supports, rotary drive means mounted on the first upright support for producing rotation of the workpiece while it is supported on the first and second pairs of spherical rollers, and a gage device movable into cooperative gaging relation with a selected portion of the workpiece to check the selected portion for deviations from concentricity and straightness when the workpiece is rotated.

Each of the roller adjusting means preferably comprises a socket member for rotatably receiving one of the spherical rollers, and an adjusting mechanism mounted on the corresponding upright support for advancing the socket member and the roller received therein toward the other roller of the same pair.

The adjusting mechanism may comprise screw means mounted on the corresponding upright support for adjustably advancing the socket member and the roller received therein toward the other roller of the same pair.

In another embodiment, the gaging apparatus comprises a horizontal supporting bed, a first upright support mounted on the bed, a second upright support mounted on the bed and spaced along the bed away from the first upright support, means affording a first pair of workpiece-supporting blades mounted on the first upright support and having respective supporting edges extending in a V-shaped formation for engaging and supporting a first portion of the workpiece, means affording a second pair of workpiece-supporting blades mounted on the second upright support and having respective supporting edges extending in a V-shaped formation for engaging and supporting a second portion of the workpiece spaced along the workpiece from the first portion thereof, each of the supporting edges of each of the blades having a smoothly rounded configuration for engaging the workpiece with a point contact, the first and second pairs of blades being adapted to support a generally cylindrical workpiece for rotation relative to the upright supports, rotary drive means mounted on the first upright support for producing rotation of the workpiece while it is supported on the first and second pairs of blades, and a gage device movable into cooperative gaging relation with a selected portion of the workpiece to check the selected portion for deviations from concentricity and straightness when the workpiece is rotated by the rotary drive means.

The gaging apparatus preferably includes adjustable securing means for mounting the second upright support on the bed for horizontal adjusting movement along the bed toward and away from the first upright support and for selectively securing the second upright support to the bed in any adjusted position.

In a broader aspect, the gaging apparatus comprises a generally horizontal supporting bed, a first upright support mounted on the bed, a second upright support mounted on the bed and spaced along the bed away from the first upright support, means affording a first pair of spaced smoothly rounded supporting elements mounted on the first upright support for engaging and supporting the workpiece, means affording a second pair of spaced smoothly rounded supporting elements mounted on the second upright support for engaging and supporting the workpiece, each of the supporting elements having a smoothly rounded configuration such as to engage the workpiece with a point contact, the first and second pairs of smoothly rounded supporting elements being adapted to support a generally cylindrical workpiece for rotation about its own axis relative to the upright supports, rotary drive means mounted on the first upright support for producing rotation of the workpiece while maintaining point contact engagement between the workpiece and the first and second smoothly rounded supporting elements, and a gage device movable into cooperative gaging relation with a selected portion of the workpiece to check the selected portion for deviations from concentricity and straightness when the workpiece is rotated.

The rotary drive means for the gaging apparatus preferably comprises a selectively rotatable drive pulley, mounting means for mounting the drive pulley on the first upright support, a flexible endless drive belt extending around said drive pulley and adapted to extend around the workpiece, the drive belt being disposed between the first and second upright supports, and operating means for selectively rotating the drive pulley.

The mounting means preferably includes a movable mounting member or carriage connected to the first upright support for movement toward and away from the workpiece for tightening the drive belt when it is received around the workpiece.

Resilient means may be provided for biasing the movable mounting member away from the workpiece for resiliently tightening the drive belt.

Optionally, the movable mounting member may be movable upwardly toward the workpiece and downwardly away from the workpiece whereby the drive pulley and the movable mounting member are urged downwardly away from the workpiece by the biasing action of gravity to tighten the drive belt around the workpiece.

The gaging apparatus preferably comprises latching means for latching the drive pulley and the mounting member in a position in which tension in the drive belt is relieved to loosen the drive belt for insertion and removal of the workpiece relative to the drive belt.

The drive belt preferably has a pair of flights for extending between the drive pulley and the workpiece. Preferably, the gaging apparatus comprises a pair of guide pulleys rotatably mounted on the first upright support for engaging the outer periphery of the drive belt in opposed positions along the flights of the belt for pinching the flights toward each other to a closer spacing than the diameter of the drive pulley to keep the drive belt close to the location of the workpiece when the workpiece is removed from the drive belt.

Optionally, the gaging apparatus includes a pair of rollers for engaging the outer periphery of the drive belt in opposed positions adjacent the drive pulley for pinching the flights toward each other and against the drive pulley to keep the belt close to the drive pulley when the workpiece is removed from the drive belt.

BRIEF DESCRIPTION OF THE DRAWINGS

Further objects, advantages and features of the present invention will appear from the following description, taken with the accompanying drawings, in which.

DETAILED DESCRIPTION OF ILLUSTRATIVE EMBODIMENT

Figures 1, 8:
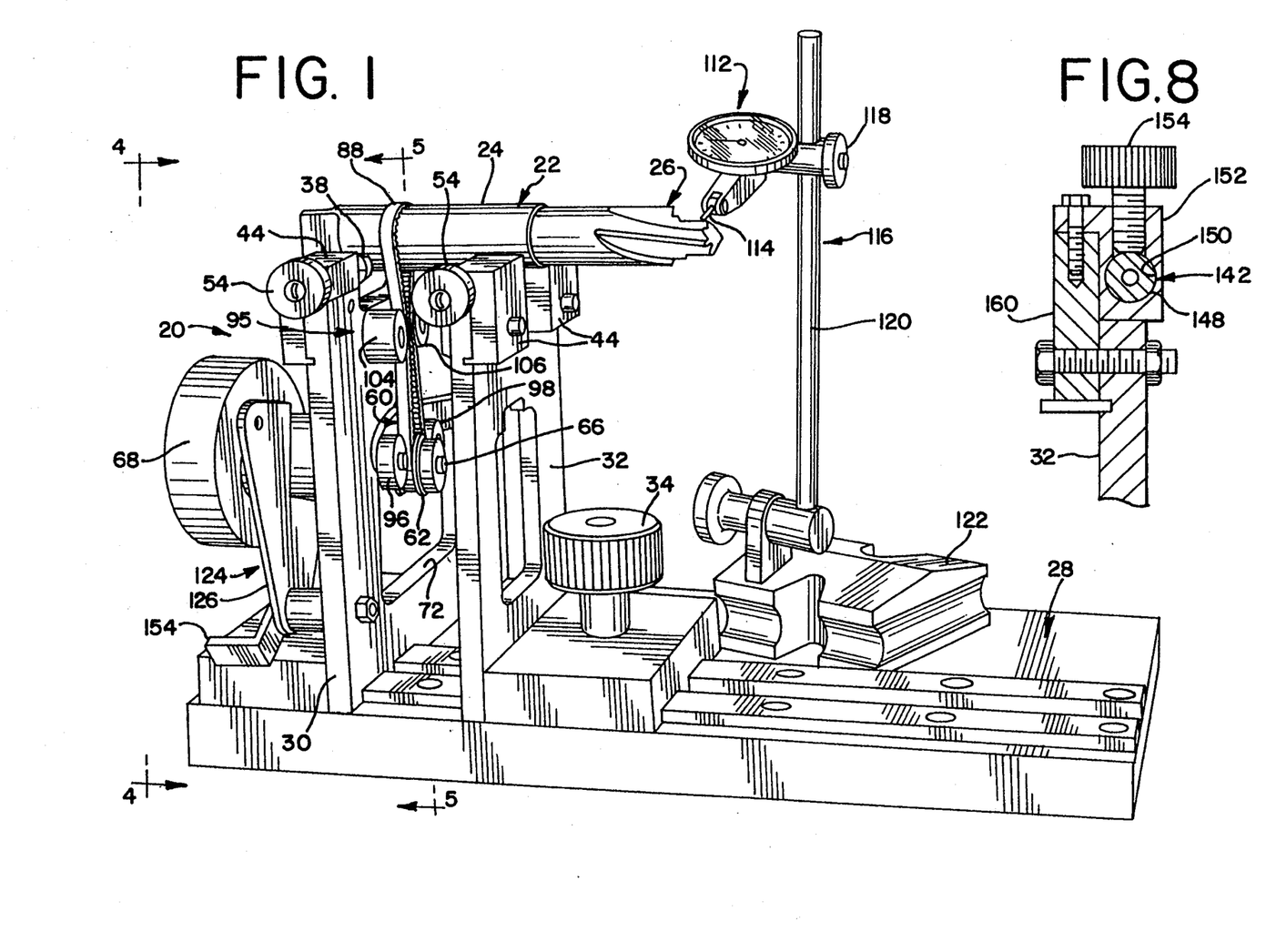
FIG. 1 is a perspective view of gaging apparatus to be described as an illustrative embodiment of the present invention.
FIG. 8 is a fragmentary vertical section, taken generally along the line 8—8 in FIG. 7.
Figures 2, 3:
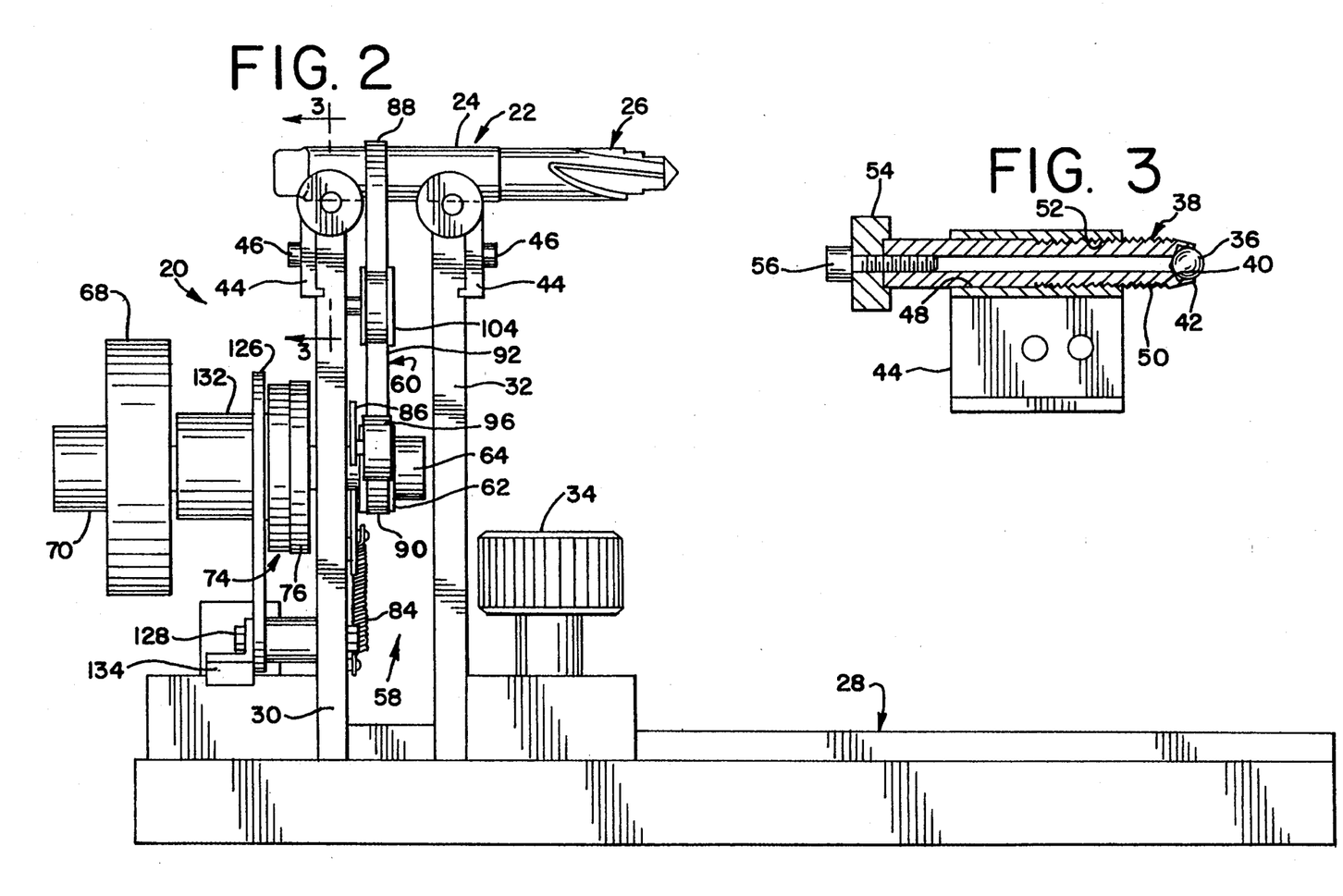
FIG. 2 is a side elevational view of the gaging apparatus of FIG. 1.
FIG. 3 is a fragmentary sectional view showing one of the devices fitted with a spherical roller for supporting the workpiece, the view being taken generally along the line 3—3 in FIG. 2.

As just indicated, FIGS. 1 and 2 illustrate gaging apparatus 20 for checking the concentricity and straightness of a tool or workpiece 22 having at least a portion which is generally cylindrical. In this case, the workpiece 22 takes the form of a shank-type tool, illustrated as a special stepped drill having a generally cylindrical shank 24 which may or may not be tapered. The tool 22 comprises a cutting portion 26 having various surfaces which are cylindrically curved and should be concentric with the cylindrical shank 24. The gaging apparatus 20 is very useful for checking all of the cylindrically curved surfaces of the tool 22 for concentricity with the shank 24. In addition, the gaging apparatus 20 is capable of checking the tool 22 for straightness.

As shown in FIGS. 1 and 2, the gaging apparatus 20 has a substantially horizontal supporting bed 28 on which first and second upright supports 30 and 32 are securely mounted. In this case, the first upright support 30 is fixedly mounted on the bed 28, at or near one end thereof, while the second upright support 32 is slidably adjustable along the bed 28 and is adapted to be securely clamped to the bed 28 by suitable means such as the illustrated clamping screw 34, so that the spacing between the upright supports 30 and 32 can be adjusted to accommodate workpieces of various lengths.

Figure 4:
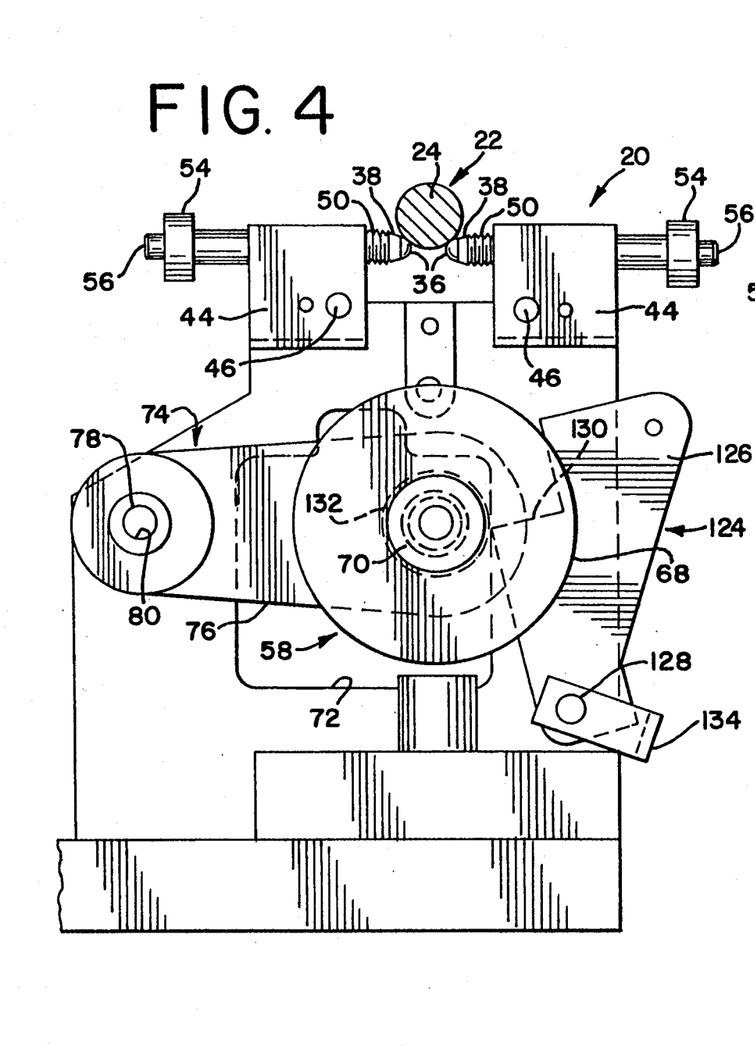
FIG. 4 is a left-hand end elevational view, taken as indicated by the line 4—4 in FIG. 1, and partly in section through the workpiece.
Figure 5:
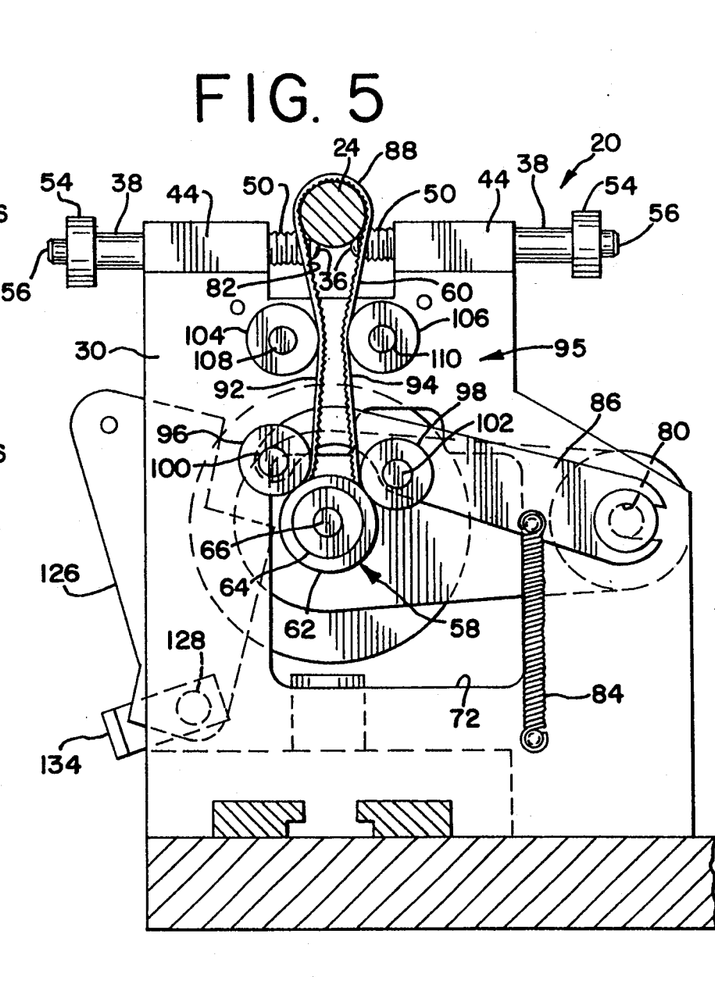
FIG. 5 is an elevational section, taken generally along the line 5—5 in FIG. 1.

As shown in FIGS. 4 and 5, each of the upright supports 30 and 32 is provided with means for supporting the generally cylindrical shank 24 of the tool 22 in such a manner that the tool 22 is freely rotatable about its own axis, such means being illustrated as comprising a pair of freely rotatable spherical balls or rollers 36 which are spaced apart by a distance substantially less than the diameter of the cylindrical shank 24 so that the shank 24 can rest by gravity on the rollers 36. There are four of the balls or rollers 36, at each of which the cylindrical shank 24 is supported at a point contact with one of the rollers 36.

Each of the upright supports 30 and 32 is provided with a pair of adjustable holders 38 constituting means for rotatably supporting the corresponding spherical rollers 36. One of the four holders 38 is illustrated in section in FIG. 3. As shown, each holder 38 is generally cylindrical and is formed at one end with a socket 40 for rotatably receiving the spherical roller 36. A circular lip 42 is formed inwardly on the holder 38 around the socket 40 for rotatably retaining the roller 36 in the socket 40. The rollers 36 are preferably made of a hard, wear-resistant ceramic material but may be made of any suitable material.

Each holder 38 is adjustably supported by a bracket 44 adapted to be fixedly mounted on one or the other of the upright supports 30 and 32. There are four of the brackets 44 which are fixedly secured to the upright supports 30 and 32 by screws or bolts 46.

Each of the holders 38 is generally cylindrical and is adjustably received in a generally cylindrical bore 48 formed in the corresponding bracket 44. Each holder 38 has an externally threaded screw portion 50 which is adjustably received in an internally threaded screw portion 52 formed in the bore 48. To provide for easy manual rotation of the holder 38, an enlarged generally cylindrical knob 54 is axially secured to the holder 38 by suitable means, such as a screw or bolt 56. By using the knobs 54 to rotate the holders 38, the spacing between the spherical rollers 36 can easily be adjusted to accommodate a wide range of diameters of the shank portion 24 of the tool or workpiece 22.

As shown to best advantage in FIG. 5, the gaging apparatus 20 is provided with rotary drive means 58 for rotating the tool or workpiece 22 while the generally cylindrical shank 24 thereof is rotatably supported on the spherical rollers 36. The drive means 58 comprise a flexible endless drive belt 60 having its upper portion looped around the cylindrical shank portion 24 of the tool or workpiece 22. The lower portion of the drive belt 60 is looped around a flanged drive pulley 62 having a hub 64 secured to a rotatable shaft 66 which in this instance is adapted to be rotated by a manually operable knob 68 having a hub 70 secured to the shaft 66. The drive pulley 62 and the knob 68 are located on opposite sides of the first upright support 30, which has a large clearance opening 72 therein through which the rotatable shaft 66 extends.

To provide for tightening and loosening the drive belt 60, the rotatable shaft 66 is mounted on a carriage 74 which is movable toward and away from the location of the tool or workpiece 22. As shown in FIG. 4, the carriage 74 comprises an arm 76 which is swingable generally in a vertical direction, toward and away from the location of the workpiece 22. The arm 76 is secured to a pivot shaft 78 which extends through an opening 80 in the first upright support 30 and is pivotally received therein.

The flexible endless belt 60 is made of natural or synthetic rubber or rubberlike material which may or may not be reinforced with longitudinal fibers. The preferred material is polyurethane synthetic rubberlike material which affords very good traction between the belt 60 and the shank portion 24 of the tool or workpiece 22. The inner side of the belt 60 is preferably formed with a multiplicity of inwardly projecting transverse ribs 82 which improve the flexibility of the belt and also enhance the traction between the belt and the cylindrical shank 24.

Tightening of the endless belt 60 is achieved by the yieldable downward biasing action of gravity on the carriage 74 and the components mounted on the carriage 74, including the drive pulley 62, the rotatable shaft 66 and the knob 68. An additional resilient biasing action is provided by resilient means in the form of a tension coil spring 84 connected between the first upright support 30 and a second arm 86 secured to the pivot shaft 78 and located on the opposite side of the upright support 30 from the first arm 76. The second arm 86 is a component of the movable carriage 74.

The drive belt 60 has an upper loop 88 extending around the shank portion 24 of the tool or workpiece 22. The drive belt 60 also has a lower loop 90 extending around the flanged drive pulley 62. Between the upper and lower loops 88 and 90, the belt 60 has a pair of flights 92 and 94.

The gaging apparatus 20 comprises belt-retaining means 95 for keeping the upper loop 88 open and for preventing the drive belt 60 from falling downwardly to any significant extent when the shank 24 of the tool or workpiece 22 is removed from the upper loop 88. In this way, the upper loop 88 remains available and easily accessible for the insertion of the shank 24 of the same or a different tool or workpiece 22.

As shown in FIGS. 2 and 5, the means 95 for retaining the drive belt 60 in its operative position, with the upper loop 88 at or near the location of the tool or workpiece 22, comprise a first pair of rollers 96 and 98 which engage the flights 92 and 94 of the belt 60 and are closely adjacent the flanged drive pulley 62 for pinching the flights 92 and 94 toward each other and thereby retaining the lower loop 90 of the belt 60 around the drive pulley 62. The rollers 96 and 98 are rotatably mounted on shafts or pivots 100 and 102 carried by the second arm 86 which is swingable with the first arm 76 so that the rollers 96 and 98 are maintained in an unchanging relationship with the flanged drive pulley 62.

The retaining means 95 for the belt 60 also comprise a second pair of rollers which are preferably in the form of flanged idler pulleys 104 and 106 which engage the outer sides of the flights 92 and 94 and pinch them toward each other at an intermediate location between the drive pulley 62 and the location of the shank portion 24 of the tool or workpiece 22. The idler pulleys 104 and 106 are rotatably mounted on fixed shafts or pivots 108 and 110 secured to the first upright support 30.

For normal gaging operations, the drive belt 60 is tightened around the shank 24 of the tool or workpiece 22 by the biasing forces produced by the tension coil spring 84 and the weight of the various components on the carriage 74, including the drive pulley 62, the shaft 66, the knob 68, the arm 76, the second arm 86, the rollers 96 and 98 and the shafts 100 and 102. The cylindrical shank 24 of the tool or workpiece 22 can be rotated by manually turning the knob 68 so as to rotate the shaft 66 and the flanged drive pulley 62. The flexible belt 60 transmits the rotation of the pulley 62 to the shank portion 24 of the tool or workpiece 22.

In order to check the concentricity and straightness of the tool or workpiece 22, the gaging apparatus 20 is provided with a gage device 112 which may be of any known or suitable type but is shown in FIG. 1 as a dial indicator having a movable plunger or probe 114 which can be moved into engagement with any desired surface or portion of the cutting portion 26 of the tool or workpiece 22. In order to provide for adjustment of the position of the dial indicator 112, it is adjustably mounted on an adjustable stand 116 including a manually operable clamp 118 which is adjustably mounted on a post 120, adjustably connected to a base 122 which is adjustably mounted on the supporting bed 28. While the dial indicator 112 is readily available and easy to use, it may be replaced by any more sophisticated gage device.

When the tool or workpiece 22 is to be removed from the gaging apparatus 20, the drive belt 60 can be loosened by lifting the knob 68 or any other accessible component of the carriage 74, so as to move the drive pulley 62 toward the location of the tool or workpiece 22. The belt-tightening forces exerted by gravity and by the spring 84 are thus removed from the belt 60. The shank 24 of the tool 22 can then easily be withdrawn from the upper loop 88 of the belt 60. The upper loop 88 remains open and does not fall, due to the belt-retaining action of the rollers 96 and 98 and the idler pulleys 104 and 106.

The gaging apparatus 20 is provided with a latching means or mechanism 124 for retaining the knob 68 and the carriage 74 in their raised position, with the belt 60 loosened. As shown in FIG. 4, the latching mechanism 124 comprises a latching arm 126 swingable about a pivot 128 mounted on the first upright support 30. The latching arm 126 has a latching ledge or surface 130 which is movable under a bearing or hub 132 through which the rotatable shaft 66 of the drive pulley 62 extends. The bearing or hub 132 is mounted on the first arm 76 of the carriage 74. The latching surface 130 of the latching arm 126 is movable under the bearing or hub 132 by manually swinging the latching arm 126 to the left or counterclockwise from the position shown in FIG. 4. As shown, an operating handle 134 is connected to the latching arm 126. When the latching arm 126 has been swung to its latching position, the knob 68 is allowed to move downwardly due to the biasing forces provided by gravity and by the spring 84. The bearing or hub 132 is thus allowed to move downwardly into engagement with the latching surface 130. The flanged drive pulley 62 is still well above its normal operating position, so that the belt 60 is still loosened. The latching arm 126 is frictionally retained in its latching position due to the engagement between the latching surface 130 and the bearing or hub 132.

When the shank 24 of a different tool or workpiece 22 is inserted through the upper loop 88 of the belt 60 and is placed on the four spherical rollers 36, the latching arm 126 may be swung in a clockwise direction to its unlatched position (FIGS. 1, 4 and 5) to disengage the latching surface 130 from the bearing or hub 132, so that the drive pulley 62 can be moved downwardly to its belt-tightening position by the forces of gravity and the spring 84.

Figure 6:
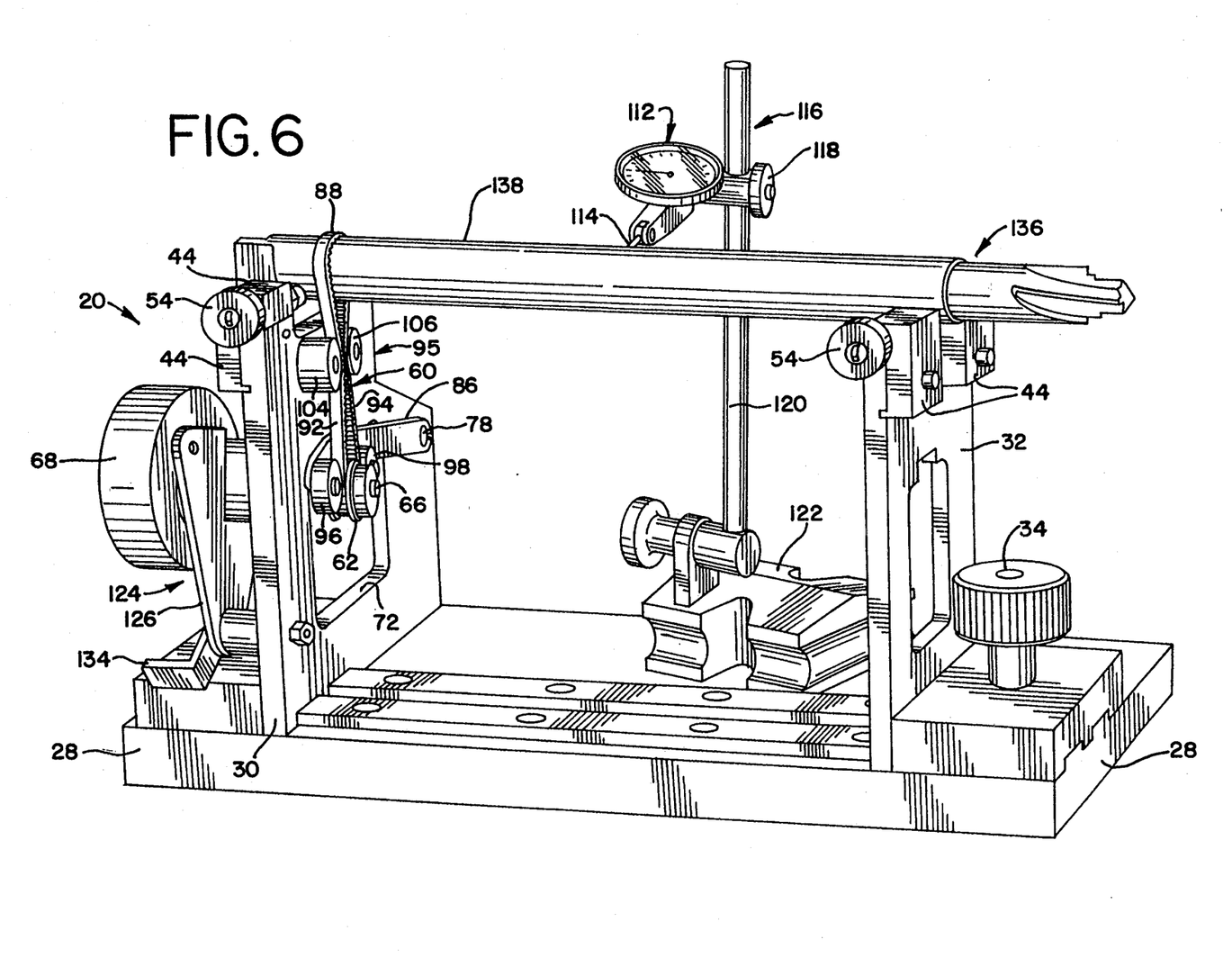
FIG. 6 is a perspective view similar to FIG. 1, but showing the gaging apparatus with a different adjustment to support a workpiece having an extra-long shank.

FIG. 6 is a perspective view similar to FIG. 1, but showing the gaging apparatus 20 with a different adjustment for use with a different tool or workpiece 136 having an extra-long generally cylindrical shank 138. To accommodate the extra-long shank 138, the second upright support 32 has been moved along the bed 28 to a position widely spaced from the first upright support 30, whereby the two pairs of spherical supporting rollers 36 engage the shank 138 toward the opposite ends thereof. The dial indicator 112, constituting the gage device, is positioned so that the operating plunger 114 of the dial indicator 112 is engaged with an intermediate portion of the generally cylindrical shank 138. Thus, the dial indicator 112 is positioned to check the concentricity and particularly the straightness of the shank 138. In FIG. 6, the adjustable stand 116 for the dial indicator 112 is positioned on the bed 28 between the first and second upright supports 30 and 32. It will be understood that the dial indicator 112 may be replaced with any known or suitable gage device.

Figure 7:
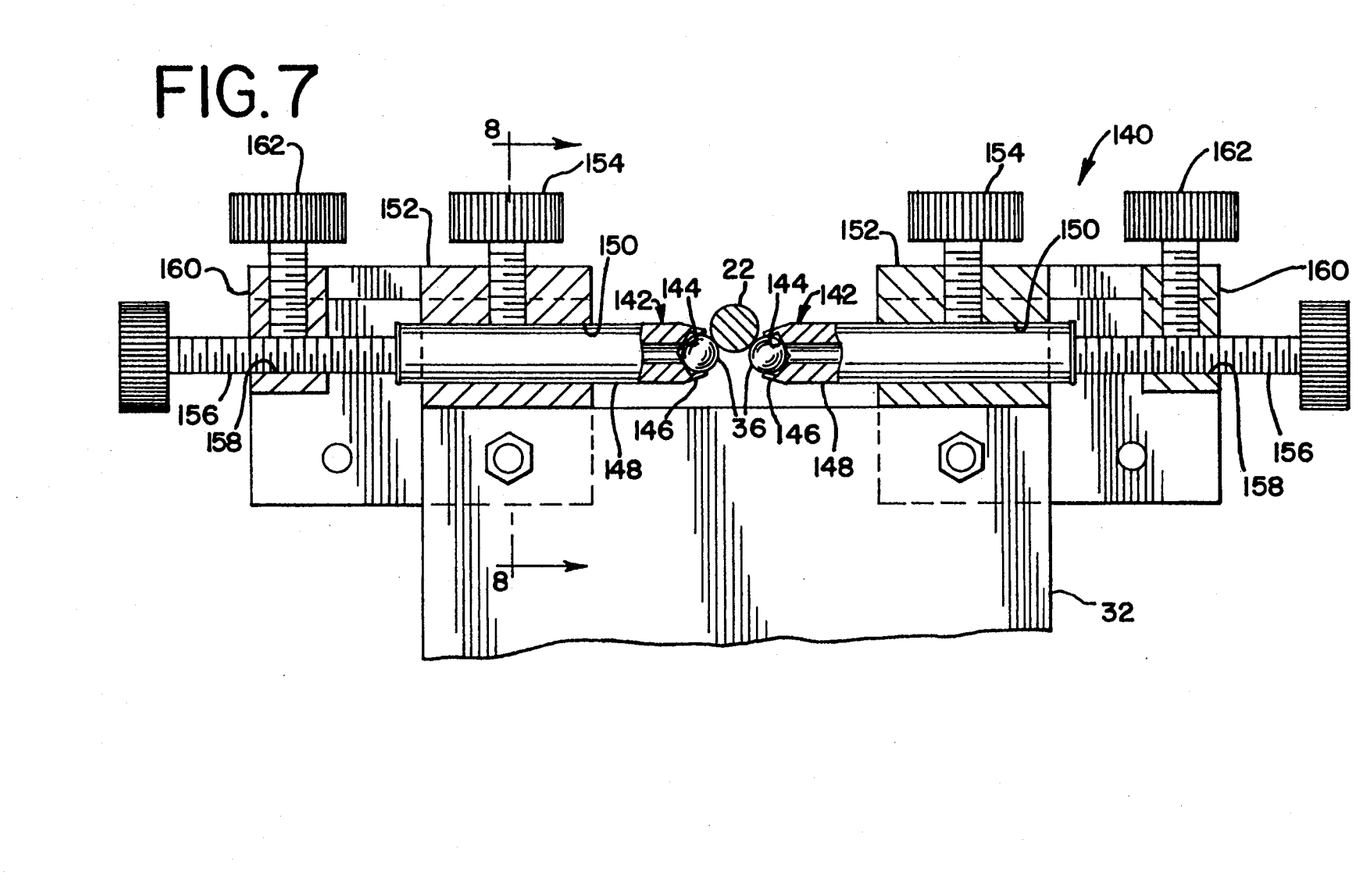
FIG. 7 is a fragmentary elevational sectional view showing a modified construction of the spherical roller supporting devices for the gaging apparatus.

FIGS. 7 and 8 illustrate a modified gaging apparatus 140 which differs from the previously described gaging apparatus of FIGS. 1-6, in that the modified gaging apparatus 140 has modified adjustable holders 142 for the spherical rollers 36, which, as before, are preferably made of a hard, wear-resistant ceramic material, but the rollers 36 may be made of any other known or suitable material. As before, the holders 142 are formed with sockets 144 in which the rollers 36 are freely rotatable. The rollers 36 are retained in the sockets 144 by circular lips 146 formed inwardly on the holders 142 around the open ends of the sockets 144.

The modified holders 142 differ from the previously described holders 38 in that the modified holders 142 are not externally threaded but rather have smooth cylindrical outer surfaces 148 which are slidably received in cylindrical bores 150 formed in modified supporting brackets 152 which may be bolted or otherwise secured to the upright supports 30 and 32. FIG. 7 shows one pair of the adjustable holders 142 supported by one pair of the brackets 152 mounted on the second upright support 32, but it will be understood that the modified gaging apparatus 140 comprises a second pair of the adjustable holders 142 which are supported by another pair of the brackets 152 mounted on the first upright support 30.

To provide for adjustment of the spacing between the spherical rollers 36, the holders 142 are slidably adjustable along the bores 150 in the brackets 152. The brackets 152 are fitted with clamping screws 154 for engaging and clamping the holders 142 in their adjusted positions.

To provide for easy and precise adjustment of the holders 142, the gaging apparatus 140 includes manually adjustable feed screws 156 for engaging and advancing the holders 142. The feed screws 156 are threaded through internally threaded openings 158 formed in additional bracket components 160 which are bolted or otherwise suitable secured to the upright supports 30 and 32, the support 32 being illustrated in FIG. 7. In order to maintain the adjustment of the feed screws 156, the additional bracket components 160 are threaded with clamping screws 162 which are engageable with the feed screws and are adapted to clamp them against rotation.

Except as illustrated in FIGS. 7 and 8, and as described in connection with FIGS. 7 and 8, the modified gaging apparatus 140 may be the same in construction as the previously described gaging apparatus 20, illustrated in FIGS. 1-6. The various features of the gaging apparatus 20 and the modified gaging apparatus 140 may be combined in any suitable manner, as desired.

FIGS. 9-14 illustrate another modified gaging apparatus 164 which employs two pairs of blades 166 instead of the spherical rollers 36 for rotatably supporting the generally cylindrical tool or workpiece 22. The blades 166 are secured to corresponding brackets 168 by means of screws 170 or in some other suitable manner. The brackets 168 are mounted on the upright supports 30 and 32 by means of screws 172 or in some other suitable manner, the upright support 32 being illustrated in FIGS. 9 and 10. The mounting of the blades 166 on the upright support 30 may be substantially the same.

Figure 9:
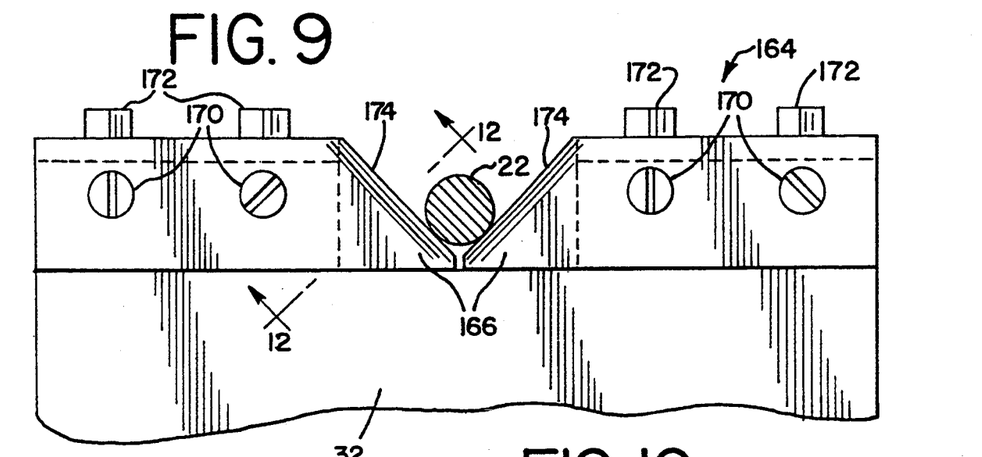
FIG. 9 is a view similar to FIG. 7 but showing modified means comprising a pair of blades for rotatably supporting the workpiece.
Figures 10, 11, 12:
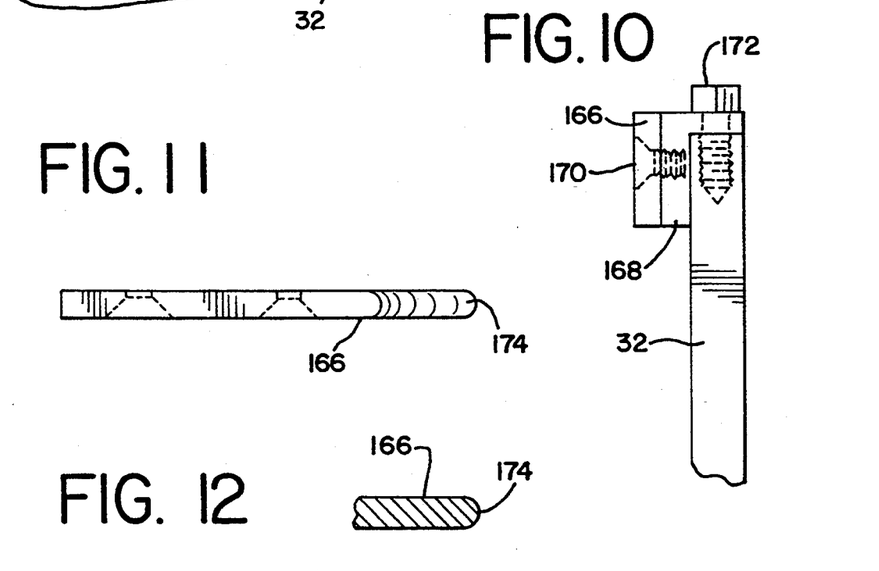
FIG. 10 is a right end elevational view of the modified construction of FIG. 9.
FIG. 11 is a top plan view of the left hand blade for supporting the workpiece.
FIG. 12 is a fragmentary sectional view, taken through one of the blades, generally along the line 12—12 in FIG. 9.
Figure 13:
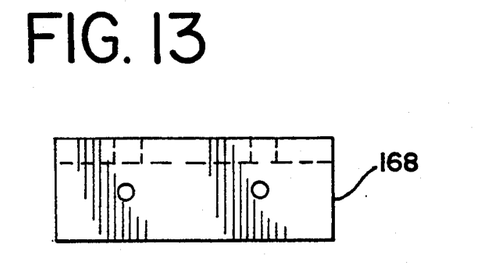
FIG. 13 is a left side elevational view of a bracket for supporting one of the blades.
Figure 14:
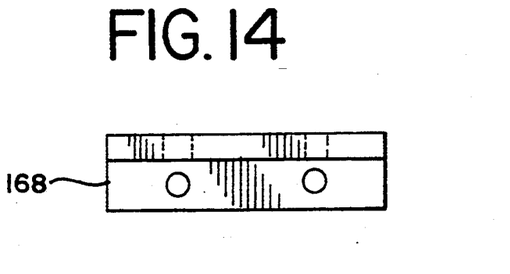
FIG. 14 is a right side elevational view of the bracket of FIG. 13.

As shown in FIG. 9, the blades 166 of each pair have inclined edges 174 which are arranged in a generally V-shaped formation, for supporting the cylindrical tool or workpiece 22. The illustrated edges 174 of the adjacent blades 166 are inclined in opposite directions at approximately 45 degrees, so that the angle between the adjacent edges 174 is approximately 90 degrees. As illustrated, each pair of adjacent blades 166 comprises a left-hand blade 166 and a right-hand blade 166 having oppositely inclined edges 174 which are smoothly rounded with a cylindrical curvature, as shown in FIGS. 11 and 12, so that each of the edges makes a point contact with the cylindrical surface of the tool or workpiece 22. The edges 174 are highly polished so that the tool or workpiece 22 is easily rotatable while it is supported on the edges 174. The blades 166 are made of a hard, wear-resistant material, such as hardened tool steel, for example. The blades 166 are conveniently formed separately but could be formed in one piece.

Except as described and illustrated in FIGS. 9–14, the construction of the modified gaging apparatus 164 may be the same as the previously described gaging apparatus 20, illustrated in FIGS. 1–6. The operation and use of the modified gaging apparatus 164 is quite similar to the operation and use of the gaging apparatus 20. The generally cylindrical tool or workpiece 22 is rotatably supported on the smoothly rounded edges 174 of the two pairs of blades 166, mounted on the upright supports 30 and 32. Each of the four blades 166 makes a point contact with the cylindrical surface of the tool or workpiece 22. Because of the friction between the blades 166 and the tool or workpiece 22, it is not as freely rotatable as it is when the tool or workpiece 22 is supported by the spherical rollers 36 of the gaging apparatus 20. However, the drive belt 60 affords sufficient traction to rotate the tool or workpiece 22 when it is supported upon the smoothly rounded edges 174 of the blades 166, particularly when the drive belt 60 is made of polyurethane synthetic rubberlike material. Because of the V-shaped configuration of the edges 174, the blades 166 are capable of rotatably supporting tools or workpieces 22 having a wide range of diameters.

Various other modifications, alternative constructions and equivalents may be employed without departing from the true spirit and scope of the present invention as described in the preceding specification and as defined in the appended claims.

I claim:

1. Gaging apparatus for use in gaging the concentricity and straightness of a generally cylindrical tool or other workpiece, said gaging apparatus comprising
   a horizontal supporting bed,
   a first upright support mounted on said bed,
   a second upright support mounted on said bed and spaced along said bed away from said first upright support,
   a first pair of substantially spherical rollers adapted to be adjustably mounted in a spaced opposed relation on said first upright support,
   a first pair of roller adjusting means for adjustably supporting said first pair of spherical rollers on said first upright support for adjusting movement toward and away from each other to vary the spacing therebetween to accommodate workpieces of different diameters,
   a second pair of substantially spherical rollers adapted to be adjustably mounted in a spaced opposed relation on said second upright support,
   a second pair of roller adjusting means for adjustably supporting said second pair of spherical rollers on said second upright support for adjusting movement toward and away from each other to vary the spacing therebetween to accommodate workpieces of different diameters,
   said first and second pairs of spherical rollers being adapted to support a generally cylindrical workpiece for rotation relative to said upright supports,
   rotary drive means mounted on said first upright support for producing rotation of the workpiece while it is supported on said first and second pairs of spherical rollers,
   and a gage device movable into cooperative gaging relation with a selected portion of the workpiece to check the selected portion for deviations from concentricity and straightness when the workpiece is rotated,
   said rotary drive means comprising a selectively rotatable drive pulley,
   mounting means for mounting said drive pulley on said first upright support,
   a flexible endless drive belt extending around said drive pulley and adapted to extend around the workpiece,
   said drive belt being disposed between said first and second upright supports,
   and operating means for selectively rotating said drive pulley.

2. Gaging apparatus according to claims 1,
   in which said mounting means includes a movable mounting member connected to said first upright support for movement toward and away from the workpiece for tightening said drive belt when it is received around the workpiece.

3. Gaging apparatus according to claim 2,
   including resilient means for biasing said movable mounting member away from the workpiece for resiliently tightening said drive belt.

4. Gaging apparatus according to claim 3,
   including latching means for latching said drive pulley and said mounting member in a position in which tension in said drive belt is relieved to loosen said drive belt for insertion and removal of the workpiece relative to said drive belt.

5. Gaging apparatus according to claim 2,
   in which said movable mounting member is movable upwardly toward the workpiece and downwardly away from the workpiece whereby said drive pulley and said movable mounting member are urged downwardly away from the workpiece by the biasing action of gravity to tighten said drive belt around the workpiece.

6. Gaging apparatus according to claim 2,
   in which said drive belt has a pair of flights for extending between said drive pulley and the workpiece,
   said belt having an outer periphery,
   and a pair of guide pulleys rotatably mounted on said first upright support for engaging the outer periphery of said drive belt in opposed positions along said flights of said belt for pinching said flights toward each other to a closer spacing than the diameter of said drive pulley to keep said drive belt close to the location of the workpiece when the workpiece is removed from said drive belt.

7. Gaging apparatus according to claim 6, including a pair of rollers for engaging the outer periphery of said drive belt in opposed positions adjacent said drive pulley for pinching said flights toward each other and against said drive pulley to keep said belt close to said drive pulley when the workpiece is removed from the drive belt.

8. Gaging apparatus according to claim 2, including a pair of rollers for engaging the outer periphery of said drive belt in opposed positions adjacent said drive pulley for pinching said flights toward each other and against said drive pulley to keep said belt close to said drive pulley when the workpiece is removed from the drive belt and to keep said drive belt close to the location of the workpiece when the workpiece is removed from the drive belt.

9. Gaging apparatus for use in gaging the concentricity and straightness of a generally cylindrical tool or other workpiece, said gaging apparatus comprising
a horizontal supporting bed,
a first upright support mounted on said bed,
a second upright support mounted on said bed and spaced along said bed away from said first upright support,
means affording a first pair of workpiece-supporting blades mounted on said first upright support and having respective supporting edges extending in a V-shaped formation for engaging and supporting a first portion of the workpiece,
means affording a second pair of workpiece-supporting blades mounted on said second upright support and having respective supporting edges extending in a V-shaped formation for engaging and supporting a second portion of the workpiece spaced along the workpiece from the first portion thereof,
each of said supporting edges of each of said blades having a smoothly rounded configuration for engaging the workpiece with a point contact,
said first and second pairs of blades being adapted to support a generally cylindrical workpiece for rotation relative to said upright supports,
rotary drive means mounted on said first upright support for producing rotation of the workpiece while it is supported on said first and second pairs of blades,
and a gage device movable into cooperative gaging relation with a selected portion of the workpiece to check the selected portion for deviations from concentricity and straightness when the workpiece is rotated by said rotary drive means,
said rotary drive means comprising a selectively rotatable drive pulley,
mounting means for mounting said drive pulley on said first upright support,
a flexible endless drive belt extending around said drive pulley and adapted to extend around the workpiece,
said drive belt being disposed between said first and second upright supports,
and operating means for selectively rotating said drive pulley.

10. Gaging apparatus according to claim 9, in which said mounting means includes a movable mounting member connected to said first upright support for movement toward and away from the workpiece for tightening said drive belt when it is received around the workpiece.

11. Gaging apparatus according to claim 10, including resilient means for biasing said movable mounting member away from the workpiece for resiliently tightening said drive belt.

12. Gaging apparatus according to claim 11, including latching means for latching said drive pulley and said mounting member in a position in which tension in said drive belt is relieved to loosen said drive belt for insertion and removal of the workpiece relative to said drive belt.

13. Gaging apparatus according to claim 10, in which said movable mounting member is movable upwardly toward the workpiece and downwardly away from the workpiece whereby said drive pulley and said movable mounting member are urged downwardly away from the workpiece by the biasing action of gravity to tighten said drive belt around the workpiece.

14. Gaging apparatus according to claim 10, in which said drive belt has a pair of flights for extending between said drive pulley and the workpiece,
said belt having an outer periphery,
and a pair of guide pulleys rotatably mounted on said first upright support for engaging the outer periphery of said drive belt in opposed positions along said flights of said belt for pinching said flights toward each other to a closer spacing than the diameter of said drive pulley to keep said drive belt close to the location of the workpiece when the workpiece is removed from said drive belt.

15. Gaging apparatus according to claim 14, including a pair of rollers for engaging the outer periphery of said drive belt in opposed positions adjacent said drive pulley for pinching said flights toward each other and against said drive pulley for keeping said belt close to said drive pulley when the workpiece is removed from the drive belt.

16. Gaging apparatus according to claim 10, Including a pair of rollers for engaging the outer periphery of said drive belt in opposed positions adjacent said drive pulley for pinching said flights toward each other and against said drive pulley for keeping said belt close to said drive pulley when the workpiece is removed from the drive belt and for keeping said drive belt close to the location of the workpiece when the workpiece is removed from the drive belt.

* * * * *